United States Patent [19]

Jönsson

[11] Patent Number: 5,372,720

[45] Date of Patent: Dec. 13, 1994

[54] METHOD FOR PURIFICATION OF WASTEWATER

[75] Inventor: Kurt A. Jönsson, Nynäshamn, Sweden

[73] Assignee: Nordic Water Products AB, Nynäshamn, Sweden

[21] Appl. No.: 984,568

[22] PCT Filed: Sep. 4, 1991

[86] PCT No.: PCT/SE91/00582

§ 371 Date: Mar. 8, 1993

§ 102(e) Date: Mar. 8, 1993

[87] PCT Pub. No.: WO92/04284

PCT Pub. Date: Mar. 19, 1992

[30] Foreign Application Priority Data

Sep. 7, 1990 [SE] Sweden ............... 9002864

[51] Int. Cl.$^5$ .................. C02F 3/06; C02F 3/30
[52] U.S. Cl. ........................... 210/610; 210/614; 210/617; 210/903; 210/906
[58] Field of Search ............. 210/617, 615, 616, 403, 210/906, 614, 610

[56] References Cited

U.S. PATENT DOCUMENTS

| | | | |
|---|---|---|---|
| 4,167,479 | 9/1979 | Besik | 210/7 |
| 4,279,753 | 7/1981 | Nielson et al. | 210/903 |
| 4,353,800 | 10/1982 | Besik | 210/605 |
| 4,917,802 | 4/1990 | Fukaya et al. | 210/906 |

FOREIGN PATENT DOCUMENTS

| | | |
|---|---|---|
| 0293521 | 12/1988 | European Pat. Off. |
| 0378521 | 7/1990 | European Pat. Off. |
| WO86/03734 | 7/1986 | WIPO |

OTHER PUBLICATIONS

Patent Abstracts of Japan, vol. 7, No. 100, 1983.
Research Journal WPCF, vol. 62, No. 3, 1990.

*Primary Examiner*—Thomas Wyse
*Attorney, Agent, or Firm*—Jacobson, Price, Holman & Stern

[57] ABSTRACT

A method of reducing nitrogen, phosphor, and excessive biological oxygen demand (BOD) in wastewater supplied to and passing through a granular filter bed activated with bacteria includes in the flow direction of the wastewater through the bed simultaneously precipitation of phosphorous, denitrification and reduction of the excessive BOD in a single process step. The reduction of excess BOD is produced by blowing in an oxygen-containing gas, preferably air. Immediately before the wastewater enters the filter bed a precipitation/flocculation agent may be added for precipitation of phosphor.

20 Claims, No Drawings

METHOD FOR PURIFICATION OF WASTEWATER

BACKGROUND OF THE INVENTION

This invention relates to a method of purification of waste water by treatment in a granular filter bed that has been activated by bacteria, preferably heterotrophic bacteria.

It is known in the art to remove nitrogen and phosphor simultaneously from wastewater with the use of an active sludge that contains aerobic bacteria. It is also known from the Swedish patent No 456 990 to add the sludge in anaerobic conditions, so that the aerobic bacteria are urged to liberate phosphor, which the anaerobic bacteria can then take up. The process takes place in treatment basins under heavy agitation.

It is known from the French patent No 2619 804 to denitrify drinking water using a granular filter bed, to which are added sources of phosphor and carbon. Here, the majority of the phosphor is taken up by anaerobic bacteria.

BRIEF SUMMARY OF THE INVENTION

It is an object of this invention to provide a method in contradistinction to the known art cited above, wherein wastewater is treated, in a granular filter bed that has been activated by bacteria, preferably heterotrophic bacteria. According to the invention, there then occurs simultaneous precipitation of phosphor and denitrification in the wastewater during the first part of its percolation through the filter bed, and later on in the bed an excess biological oxygen demand (BOD) is reduced, preferably close to zero.

It should be noted that before the mentioned inventive method is applied, the water has been first subjected to nitrification according to the known art, such that the nitrogen compounds in the wastewater have been converted to nitrates or to nitrites.

DETAILED DESCRIPTION

In a preferred method according to the invention, the BOD reduction takes place with the addition of oxygen, and, especially, in a simple and advantageous method, by blowing an oxygen-containing gas, preferably air.

A precipitation/flocking agent for precipitating phosphor is added to the wastewater immediately before the latter enters the filter bed.

The quantity of organic substances in wastewater that can function as sources of carbon for the bacterium strain is often not enough to provide sufficient denitrification. It may be necessary to add a further source of carbon, cheap hydrocarbons such as methanol, starch or molasses being selected for this purpose. These carbon sources may suitably be added to the wastewater immediately before it enters the filter bed. It is probable that the founding strain of bacteria adhere to the grains, usually sand, of the filter bed. Here they come into intimate contact with the carbon source, and nitrates present are reduced to nitrogen gas. A typical formula for such denitrification is:

$$NO_3 + 1.08\ CH_3OH + H^+ = 0.065 C_5H_7O_2N + 0.47 N_2 + 0.76 CO_2 + 2.44\ H_2O$$

where 0.065 $C_5H_7O_2N$ corresponds to the production of new bacteria.

If the amount of sludge is increased by relatively large and voluminous precipitates or floccules of phosphor, e.g. iron phosphate, then it is reasonable to assume that denitrification will be disturbed unfavorably by these precipitations. However, no negative effect at all by the phosphates on the denitrification process in different types of filter bed has been found. There thus exists the basic condition for enabling simultaneously the reduction of nitrogen, precipitation of phosphor, reduction of excessive BOD and filtration in a single process step, which requires two or three steps according to the known prior art.

Iron chloride is a suitable precipitation agent for phosphor. Other suitable precipitation/flocculation agents in use.. e.g. aluminum sulphate with or without polyeletrolyte additives, lime etc, have been found not to affect the denitrification process either.

A factor supposed to affect denitrification is washing the filter bed. Practically, it is quite possible to wash the bed so thoroughly that the bacterium strain is unfavorably reduced. Heavy counter-flushing of a stationary filter appears to be particularly injurious. However, it has been found that the washing sufficient for removing sludge and contaminants from the sand does not notably impoverish the bacterium strain. All the nitrogen gas that may be entrained in the sand and sludge is also removed in such washing. The so-called continuous sand filters are particularly favorable for use in a method according to the present invention, only a small portion of the filter bed at a time being subjected to such washing. In these sand filters, where most contaminated sand is taken away for washing, and then returned to the filter bed, there are great possibilities for regulating both the intensity and periodicity of washing, such as sand filter, which is very suitable for denitrification and purification from phosphor, as described in the Swedish patent specification No 7602999-0.

Denitrification is directly proportional to the total surface of the sand grains in the filter bed. Its capacity may be improved by reducing the size of the grains and/or by increasing its height. At the same time, the period of active residence between washings of each grain in the bed can thus be extended also.

The result obtained, i.e. nitrogen and phosphor reductions, is mainly controlled by the added quantities of carbon source and phosphor precipitation agents. By a well-balanced selection of these factors, a simultaneous nitrogen and phosphor reduction of over 90% may be obtained for a surface load on the filter bed of 15 m/h.

In the practical operation of a filter described above, there may be large variations in the composition of the incoming wastewater. The amount of sludge as well as the nitrogen and phosphor contents may vary greatly within relatively short periods of time. The addition of carbon source should not be of the order of magnitude enabling an unnecessarily large BOD load to be achieved in the departing water, neither should it be too low for achieving an optimum result.

Continuous monotoring of the incoming and/or outgoing water with respect to the content of nitrogen, phosphor and its BOD/COD (biological/chemical oxygen demand) can be arranged to control, in accordance with the known art, the amounts of the additives such as to obtain optimum conditions.

In a granular filter bed, denitrification and phosphor precipitation are both rapid, compared with corresponding processes in a basin. The residence time for wastewater in a continuously operating filter bed, for example, is of the order of magnitude 10 min, compared with several hours in a basin. This makes it particularly advantageous, in carrying out simultaneous nitrogen and phosphor reduction in a continuously operating filter bed, to regulate the additions of carbon source and/or precipitating agent on the basis of measured values of nitrogen and/or BOD/COD, preferably in the outgoing wastewater. This control of the additives can also be used to advantage when the invention is applied to the stationary filter beds.

In certain cases it may, however, be suitable to dispense with regulation of the carbon source, and knowingly add excessive amounts thereof instead, thus creating a high BOD. But even with regulation of the carbon source additive, it would in most cases be impossible to meet the ever more severe requirements for low BOD in the outgoing wastewater now being demanded. The invention thus solves the problems, not only with respect to the simultaneous phosphor precipitation and denitrification, but also the invention, the reduction of BOD excess is accomplished by blowing an oxygen-containing gas, usually air, into the upper part of a filter bed. This may be performed by blowing the gas through a row of nozzles or jets, for example.

I claim:

1. A method of reducing nitrogen, phosphor and excessive biological oxygen demand (BOD) in wastewater, comprising:
   supplying said wastewater to a granular filter bed for passing said wastewater therethrough;
   activating said granular filter bed with bacteria; and
   in the flow direction of said wastewater through said filter bed simultaneously precipitating said phosphor, reducing said nitrogen and reducing said excessive BOD in a single process step.

2. The method as claimed in claim 1 and further comprising:
   adding oxygen to said filter bed for reducing said excessive BOD.

3. The method as claimed in claim 2 wherein:
   said adding of said oxygen comprises blowing an oxygen-containing gas into said filter bed.

4. The method as claimed in claim 3 and further comprising:
   blowing said oxygen-containing gas into an upper part of said filter bed.

5. The method as claimed in claim 4 wherein:
   said oxygen-containing gas comprises air.

6. The method as claimed in claim 3 wherein:
   said oxygen-containing gas comprises air.

7. The method as claimed in claim 3 and further comprising:
   immediately before said wastewater enters said filter bed adding to said filter bed a precipitation/flocculation agent for precipitating said phosphor.

8. The method as claimed in claim 2 and further comprising:
   immediately before said wastewater enters said filter bed adding to said filter bed a precipitation/flocculation agent for precipitating said phosphor.

9. The method as claimed in claim 1 and further comprising:
   immediately before said wastewater enters said filter bed adding to said filter bed a precipitation/flocculation agent for precipitating said phosphor.

10. The method as claimed in claim 9 and further comprising:
    monitoring outgoing wastewater from said filter bed for determining the phosphor content thereof; and
    controlling the amount of said precipitation/flocculation agent added in response to said phosphor content determined by said monitoring.

11. The method as claimed in claim 1 and further comprising: in addition to the amount of organic material in the wastewater functioning as a carbon source, adding a further source of carbon to said filter bed for reduction of said nitrogen.

12. The method as claimed in claim 11 and further comprising:
    adding said further source of said carbon to said wastewater immediately prior to the entry of said wastewater into said filter bed.

13. The method as claimed in claim 12 and further comprising:
    monitoring said outgoing wastewater from said filter bed for determining the nitrogen content thereof; and
    controlling the amount of carbon added from said further source of carbon in response to said nitrogen content determined by said monitoring.

14. The method as claimed in claim 11 and further comprising:
    monitoring outgoing wastewater from said filter bed for determining the nitrogen content thereof; and
    controlling the amount of carbon added from said further source of carbon in response to said nitrogen content determined by said monitoring.

15. The method as claimed in claim 11 and further comprising:
    monitoring outgoing wastewater from said filter bed for determining the value of biological/chemical oxygen demand (BOD/COD) therein; and
    controlling said addition of carbon from said further source of carbon in response to said determined BOD/COD value.

16. The method as claimed in claim 11 and further comprising:
    monitoring outgoing wastewater from said filter bed for determining the phosphor content thereof; and
    controlling the amount of said precipitation/flocculation agent added in response to said determined said phosphor content determined by said monitoring.

17. The method as claimed in claim 16 and further comprising:
    monitoring outgoing wastewater from said filter bed for determining the value of biological/chemical oxygen demand (BOD/COD) therein; and
    controlling said addition of carbon from said further source of carbon in response to said determined BOD/COD value.

18. The method as claimed in claim 11 and further comprising: in addition to the amount of organic material in the wastewater functioning as a carbon source, adding a further source of carbon to said filter bed for reduction of said nitrogen.

19. The method as claimed in claim 18 and further comprising:
    blowing said oxygen-containing gas into an upper part of said filter bed.

20. The method as claimed in claim 1 and further comprising:
    operating said filter bed continuously.

* * * * *